July 28, 1931. P. A. MYERS 1,816,191
POWER HEAD
Filed Aug. 19, 1929 4 Sheets-Sheet 2

INVENTOR
PHILIP A. MYERS.
BY
ATTORNEY

July 28, 1931.  P. A. MYERS  1,816,191
POWER HEAD
Filed Aug. 19, 1929    4 Sheets-Sheet 3

INVENTOR
PHILIP A. MYERS.
BY
ATTORNEY

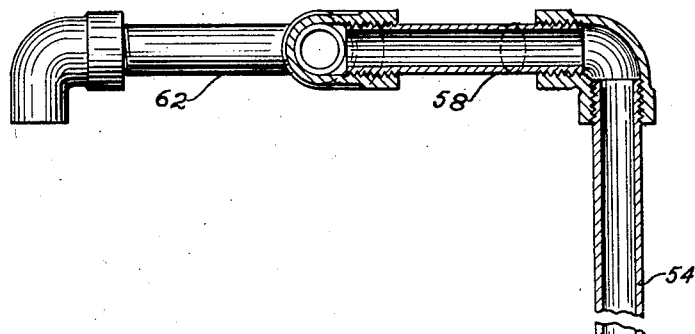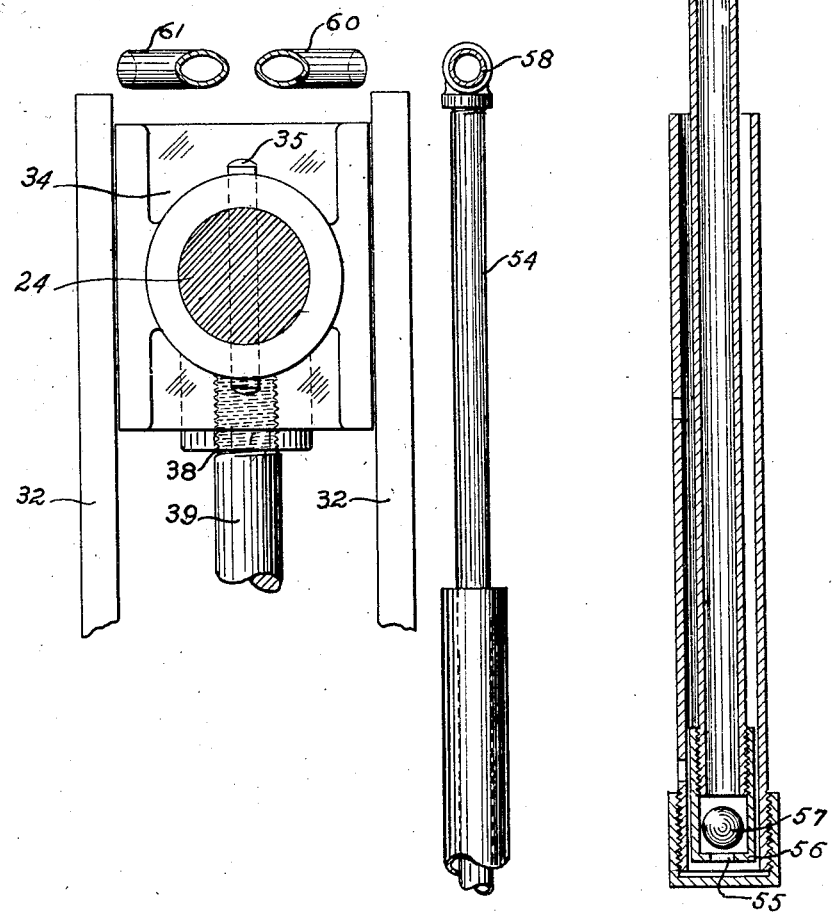

Patented July 28, 1931

1,816,191

UNITED STATES PATENT OFFICE

PHILIP A. MYERS, OF ASHLAND, OHIO, ASSIGNOR TO THE F. E. MYERS & BRO. COMPANY, OF ASHLAND, OHIO, A CORPORATION OF OHIO

POWER HEAD

Application filed August 19, 1929. Serial No. 387,040.

My invention relates to power heads.

It is the object of my invention to provide a power head that is completely self lubricated, of simple and rigid construction, applying a direct thrust to the piston rod of the pump and particularly adapted for a double acting pump because of the uniformity of the application of the power in both directions.

It is my object to provide a power head in which the guiding mechanism to impart vertical reciprocatory movement to the piston rod of the pump from the rotary movement of the power head will be self lubricated, but so arranged that such lubricant cannot splash into the pump and contaminate the water.

It is a further object to provide a stuffing box between the well tube, the piston rod and the power head to provide for a perfect seal, easy replacement and quick accessibility.

It is a further object to provide a flywheel construction in the power head to give uniformity of movement, smoothness of operation and to eliminate excess gearing and at the same time to provide a crank for proper alignment and movement of the power transmitting mechanism.

It is an object to provide a rectangular connecting link and a pair of parallel bearing shafts by which an equidistant distribution of the power, the thrusts and the strains is accomplished, and by distributing the load in this manner, the minimum of size and weight of parts is required.

It is a further object to provide not only a splash but a force feed lubrication system and a system of long bearings lubricated so as to insure long life and self-contained action on the part of the pump whereby it will require the minimum of attention.

It is a further object to provide means for guiding the piston rod of the pump and the power head mechanism one with respect to the other by a single cross head against movement in four directions so that perfect alignment will result.

Referring to the drawings:

Figure 4 is a section on the line 4—4 of Figure 3.

Figure 5 is a section on the line 5—5 of Figure 2.

Figure 1:
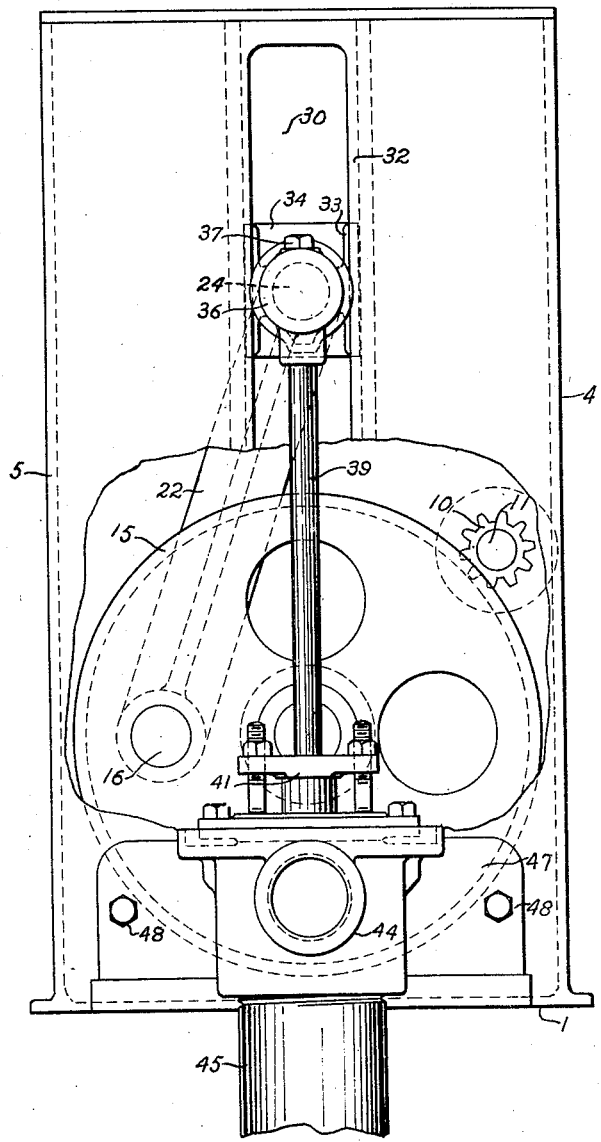
Figure 1 is an end elevation with the removable housing partially broken away.
Figure 2:
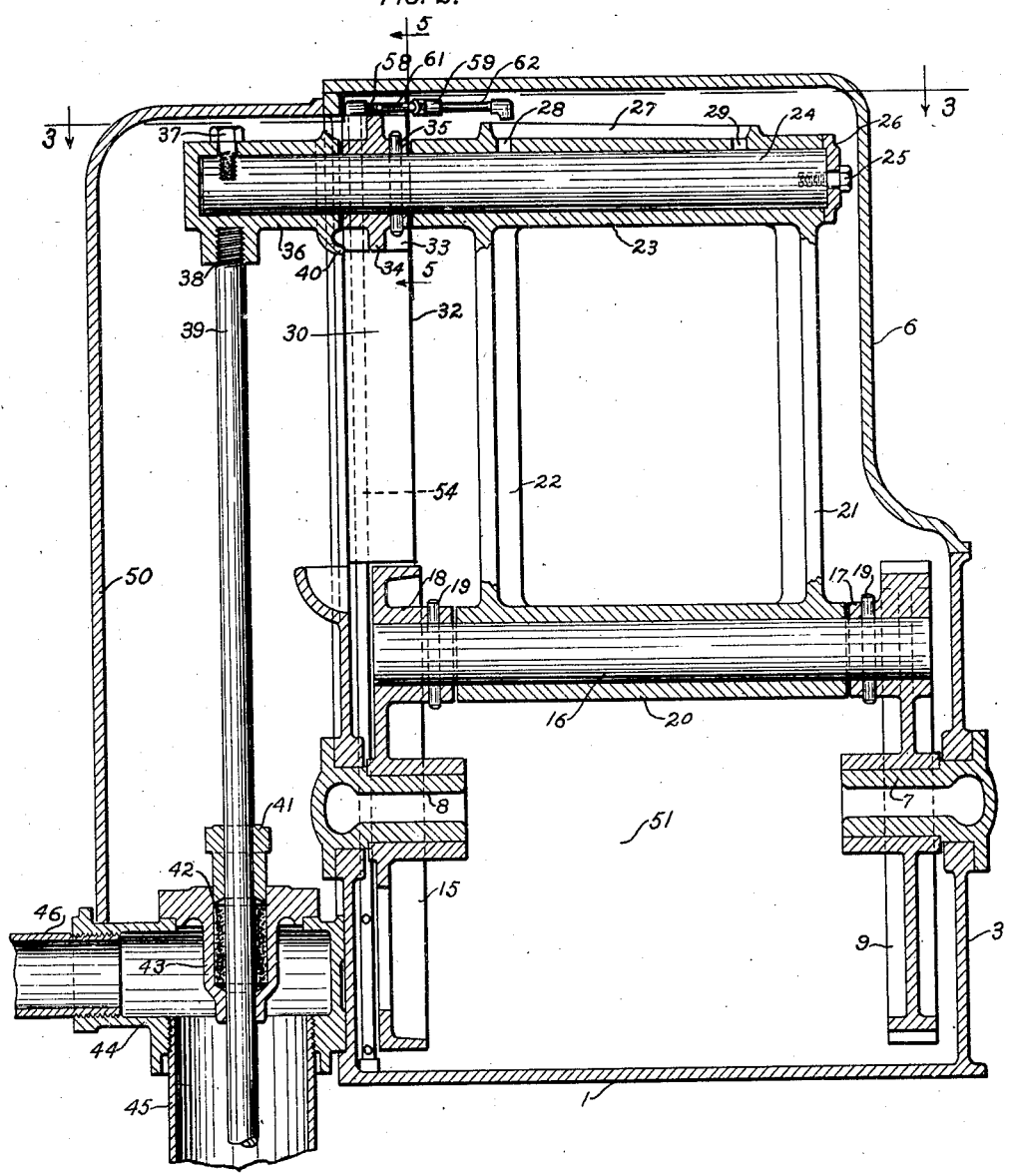
Figure 2 is a section on the line 2—2 of Figure 1.
Figure 3:
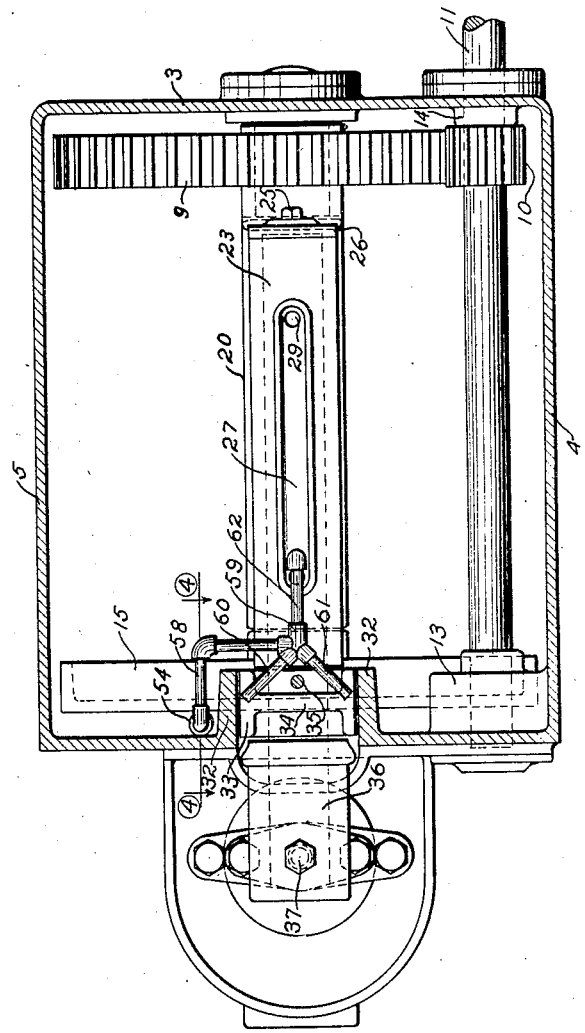
Figure 3 is a section on the line 3—3 of Figure 2.

Referring to the drawings in detail, 1 is the bottom of a casing having a forward wall toward the pump marked 2, a rear wall 3 and side walls 4 and 5. It is provided with a detachable cover 6.

In the front and rear walls 2 and 3 are mounted hollow stub shafts 7 and 8. On the shaft 7 is mounted the gear 9 which is driven by the pinion 10 from the power shaft 11 that is journaled in the front and rear walls of the casing as at 13 and 14. This power shaft extends outside of the casing and is driven by any suitable source of motive power.

The other stub shaft 8 carries a flywheel disk 15. Mounted on this flywheel disk and on the gear 9 and connecting them together is a transverse bearing shaft 16 mounted in sleeves 17 and 18 of the gear 9 and flywheel 15 respectively and pinned thereto by the pins 19. Between these sleeves and mounted upon the bearing shaft 16 is an elongated bearing sleeve 20 of a rectangular pitman which is composed of the spaced arms 21 and 22 mounted on the sleeve 20 and connected at their upper ends by a similar sleeve 23 which carries the bearing shaft 24. This bearing shaft has on one end thereof the detachable screw 25 carrying the retaining plate 26 that engages the end of the bearing sleeve 23. The top of this sleeve 23 is provided with a channel 27 for the distribution of lubricant to the ports 28 and 29 so that the lubricant can have access to the interior of the sleeve 23 and the shaft 24. The method of distributing this liquid to this channel 27 is described hereinafter.

The shaft 24 projects out of the main casing through a slot 30 in the front wall 2 of the main casing. The bottom of this slot is provided with an outwardly extending drain lip 31 for draining any lubricant back into the main casing which may drip from the side walls of the slot which are grooved at 32 for receiving the sides 33 of the cross head 34 that is pinned to the sleeve 24 by the pin 35. This cross head is guided by the side walls 32 of the slot 30 in a vertical path. The extension of the shaft 24 through the cross head carries a sleeve 36 which is pinned to the shaft 24 by the set screw 37. This sleeve has threaded into it at 38, the upper end of the piston rod 39. The sleeve is also provided with a deflector lip 40 for deflecting lubricant from the cross head slide back into the main casing where the lubricant is contained. The piston rod 39 passes through a packing gland 41 and a packing 42 contained in the packing sleeve 43 that is supported on the top of the L-shaped fitting 44 that is threaded upon the well tube 45 at the top thereof. The side of this fitting is threaded to the delivery pipe 46. This fitting is provided with a pair of laterally extending flanges 47 which are bolted by the bolts 48 to the front of the casing. The lower sides of these flanges 47 rest upon the shoulder 49 of the casing.

The piston rod at its upper end and the extended end of the shaft 24 are enclosed by a detachable housing 50.

It will be understood that lubricant is contained in a pool for splash lubrication as at 51 and it also has a supply of lubricant for forced lubrication through the delivery pump hereinafter described.

This delivery pump consists of a stationary tube 52 having inlet apertures 53 through which lubricant is drawn from the pool 51 by the suction of the pump plunger 54 which reciprocates within the tube. This pump plunger 54 has a hollow tube having an aperture 55 at the bottom formed by a threaded closure member 56. This aperture 55 is adapted to be closed on the up-stroke by a loose ball 57. This serves to deliver lubricant in a stream through the horizontal L-pipe 58 to the four-way fitting 59 which has two branches 60 and 61 delivering lubricant to the cross head slides while the other branch 62 delivers lubricant to the channel 27.

Thus, the splash and force feed lubricant is supplied from a common pool which is formed by the housing that also serves both as the support for the gearing and pitman mechanism and acts as the cross head guide for the cross head slide.

It will be understood that I desire to comprehend within my invention such modifications as may be necessary to adapt it to varying conditions and uses.

Having thus fully described my invention, what I claim as new and desire to secure by Letters Patent, is:

1. In a power head, power driving means, a rectangular frame-shaped pitman driven thereby, means for guiding one end of said pitman, and a piston rod connected to said end of the pitman.

2. In a power head, a casing supporting driving mechanism, driving mechanism, a frame-shaped pitman driven thereby, and means on said casing for guiding the free end of said pitman.

3. In a power head, a casing supporting driving mechanism, driving mechanism, a frame-shaped pitman driven thereby, and means on said casing for guiding the free end of said pitman, a piston rod connected to said free end of the pitman, and supplementary means carried by said casing for guiding said piston rod.

4. In combination in a power head, a casing, spaced driving means journaled thereon, a shaft connecting said means, a frame-shaped pitman mounted on said shaft, a second parallel shaft carried by the free end of said pitman, means on said casing for guiding the free end of the pitman, and a piston rod connected to the free end of the pitman.

5. In combination in a power head, a casing, spaced driving means journaled thereon, a shaft connecting said means, a frame-shaped pitman mounted on said shaft, a second parallel shaft carried by the free end of said pitman, means on said casing for guiding the free end of the pitman, and a piston rod connected to the free end of the pitman outside of said casing.

6. In a power head, a casing, a power shaft journaled therein, driven mechanism journaled in said casing in a plane parallel to said power shaft, a frame-shaped pitman connecting said spaced driven mechanism, means on said casing for guiding the upper end of the pitman in a vertical plane parallel to the plane of said shaft and journals of the driven mechanism, and a piston rod carried on the free end of said pitman.

7. In a power head, a casing, a power shaft journaled therein, driven mechanism journaled in said casing in a plane parallel to said power shaft, a frame-shaped pitman connecting said spaced driven mechanism, means on said casing for guiding the upper end of the pitman in a vertical plane parallel to the plane of said shaft and journals of the driven mechanism, and a piston rod carried on the free end of said pitman outside of said casing.

8. In combination, a casing, driving mechanism journaled in spaced positions on said casing, a rectangular frame-shaped pitman carried thereby therebetween, said casing having a slot vertically disposed therein, and means on the free end of said pitman for engaging the walls of said slot for guiding it.

9. In combination, a casing, driving mechanism journaled in spaced positions on said casing, a rectangular frame-shaped pitman carried thereby therebetween, said casing having a slot vertically disposed therein, means on the free end of said pitman for engaging the walls of said slot for guiding it, and a piston rod connected to the free end of said pitman outside of said casing.

10. In combination, a casing, driving mechanism journaled in spaced positions on said casing, a rectangular frame-shaped pitman carried thereby therebetween, said casing having a slot vertically disposed therein, means on the free end of said pitman for engaging the walls of said slot for guiding it, a piston rod connected to the free end of said pitman outside of said casing, and means associated with the outside of the casing for guiding said piston rod in the same vertical plane as the reciprocation of the free end of the pitman.

11. In combination in a power head of a casing, a power shaft journaled therein, gearing driven thereby journaled therein, spaced means opposite said gearing, a shaft connecting said means and said gearing adapted to move in a rotary path in said casing, a rectangular frame-shaped pitman journaled thereon, a shaft carried by the upper end of the pitman extending out of the casing, and means on the upper end of the casing for guiding the upper end of the pitman.

12. In combination in a power head of a casing, a power shaft journaled therein, gearing driven thereby journaled therein, spaced means opposite said gearing, a shaft connecting said means and said gearing adapted to move in a rotary path in said casing, a rectangular frame-shaped pitman journaled thereon, a shaft carried by the upper end of the pitman extending out of the casing, and means on the upper end of the casing for guiding the upper end of the pitman, said pitman comprising spaced elongated sleeves nearly the length of the casing, and spaced arms connecting said sleeves.

13. In combination in a power head of a casing, a power shaft journaled therein, gearing journaled therein, a flywheel journaled therein, a shaft connecting said gearing and flywheel, a pitman comprising spaced elongated sleeves and vertically disposed means connecting said sleeves, one of said sleeves being mounted on said shaft between the gear and flywheel, a second shaft carrying a cross head mounted in the other sleeve of the pitman, a cross head, and means on said casing for guiding said cross head.

14. In combination in a power head of a casing, a power shaft journaled therein, gearing journaled therein, a flywheel journaled therein, a shaft connecting said gearing and flywheel, a pitman comprising spaced elongated sleeves and vertically disposed means connecting said sleeves, one of said sleeves being mounted on said shaft between the gear and flywheel, a second shaft carrying a cross head mounted in the other sleeve of the pitman, a cross head, means on said casing for guiding said cross head, and a piston rod connected at the free end of said last mentioned shaft outside of said casing.

15. In combination in a power head of a casing, a power shaft journaled therein, gearing journaled therein, a flywheel journaled therein, a shaft connecting said gearing and flywheel, a pitman comprising spaced elongated sleeves and vertically disposed means connecting said sleeves, one of said sleeves being mounted on said shaft between the gear and flywheel, a second shaft carrying a cross head mounted in the other sleeve of the pitman, a cross head, means on said casing for guiding said cross head, and a piston rod connected at the free end of said last mentioned shaft outside of said casing, and a sleeve on said shaft for detachably supporting said piston rod.

16. In a power head, a casing having front, side and bottom walls, a power shaft journaled in the front and rear walls, a pinion thereon, a gear journaled on the rear wall, a flywheel journaled in alignment therewith on the front wall, a pitman shaft connecting said gear and flywheel, a pitman mounted thereon, a second pitman shaft carried by the upper end of the pitman, a cross head thereon, and means on said casing for guiding said cross head in a vertical path.

17. In a power head, a casing having front, side and bottom walls, a power shaft journaled in the front and rear walls, a pinion thereon, a gear journaled on the rear wall, a flywheel journaled in alignment therewith on the front wall, a pitman shaft connecting said gear and flywheel, a pitman mounted thereon, a second pitman shaft carried by the upper end of the pitman, a cross head thereon, means on said casing for guiding said cross head in a vertical path, and a piston rod mounted on said second shaft outside of said casing.

18. In a power head, a casing having front, side and bottom walls, a power shaft journaled in the front and rear walls, a pinion thereon, a gear journaled on the rear wall, a flywheel journaled in alignment therewith on the front wall, a pitman shaft connecting said gear and flywheel, a pitman mounted thereon, a second pitman shaft carried by the upper end of the pitman, a cross head thereon, means on said casing for guiding said cross head in a vertical path, and a piston rod mounted on said second shaft outside of said casing, said pitman comprising spaced elongated sleeves mounted on said shaft, and vertically disposed connecting means between said sleeves whereby the load is distributed over both shafts throughout their length.

19. In a power head, a casing, a flywheel and gear journaled on opposite walls thereof in alignment, a shaft connecting them traveling in a circular path about their axes, means for driving said gear comprising a shaft parallel to the mounting of the gear and flywheel, a pitman mounted on the first mentioned shaft, a second shaft carried on the upper end thereof extending out of the casing, a cross head thereon, means adjacent a slot in the upper portion of said casing for guiding said cross head, and a piston rod carried on the upper end of the last mentioned shaft.

20. In a power head, a casing, a flywheel and gear journaled on opposite walls thereof in alignment, a shaft connecting them traveling in a circular path about their axes, means for driving said gear comprising a shaft parallel to the mounting of the gear and flywheel, a pitman mounted on the first mentioned shaft, a second shaft carried on the upper end thereof extending out of the casing, a cross head thereon, means adjacent a slot in the upper portion of said casing for guiding said cross head, and a piston rod carried on the upper end of the last mentioned shaft, said pitman comprising spaced horizontal sleeves and spaced vertically disposed connecting arms at either end thereof.

21. In a power head, a casing, a flywheel and gear journaled on opposite walls thereof in alignment, a shaft connecting them traveling in a circular path about their axes, means for driving said gear comprising a shaft parallel to the mounting of the gear and flywheel, a pitman mounted on the first mentioned shaft, a second shaft carried on the upper end thereof extending out of the casing, a cross head thereon, means adjacent a slot in the upper portion of said casing for guiding said cross head, and a piston rod carried on the upper end of the last mentioned shaft, said pitman comprising spaced horizontal sleeves and spaced vertically disposed connecting arms at either end thereof, a sleeve on the free end of the last mentioned shaft for detachably supporting said piston rod.

22. In a power head, driving mechanism, a vertically reciprocated rectangular frame shaped pitman driven thereby, a cross head guiding said pitman to one side of said pitman, a piston rod on the other side of said cross head opposite to said pitman.

23. In a power head, driving mechanism, a vertically reciprocated rectangular frame-shaped pitman driven thereby, a cross head guiding said pitman to one side of said pitman, a piston rod on the other side of said cross head opposite to said pitman, and means remote from said cross head for guiding said piston rod in the same vertical plane as the cross head and upper end of the pitman.

24. In combination, a casing, driving mechanism mounted on the front and rear walls thereof, a longitudinally disposed rectangular frame-shaped pitman mounted therebetween of substantially the length of said casing, a shaft extending substantially the length of said casing and out a slot therein carried by the upper end of said pitman and cross head on said shaft engaging the walls of said slot, a piston rod carried on the end of said shaft beyond said cross head.

25. In combination, a casing, driving mechanism mounted on the front and rear walls thereof, a longitudinally disposed pitman mounted therebetween of substantially the length of said casing, a shaft extending substantially the length of said casing and out a slot therein carried by the upper end of said pitman and cross head on said shaft engaging the walls of said slot, a piston rod carried on the end of said shaft beyond said cross head, the proportion of said shaft beyond said cross head on the piston rod end being relatively small compared to the proportion within the casing carried by the pitman.

26. In combination, a casing, driving mechanism mounted on the front and rear walls thereof, a longitudinally disposed pitman mounted therebetween of substantially the length of said casing, a shaft extending substantially the length of said casing and out a slot therein carried by the upper end of said pitman and cross head on said shaft engaging the walls of said slot, a piston rod carried on the end of said shaft beyond said cross head, the proportion of said shaft beyond said cross head on the piston rod end being relatively small compared to the proportion within the casing carried by the pitman, said pitman having a bearing support between the driving mechanism substantially the same length as the bearing support between the shaft and the upper end of the pitman, whereby the load is equally distributed throughout the mechanism.

27. In combination, a casing, rotating driving mechanism therein, a reciprocating pitman, a horizontally disposed shaft carried on the upper end thereof rotatably, a non-rotatable cross head mounted thereon, cross head guides formed on the upper portion of said casing, and means for non-rotatably attaching a piston rod to the outer end of said shaft.

In testimony whereof, I affix my signature.

PHILIP A. MYERS.